United States Patent [19]

Vaniglia et al.

[11] Patent Number: 4,745,541
[45] Date of Patent: May 17, 1988

[54] METHOD AND APPARATUS FOR PROCESS CONTROL

[75] Inventors: Christopher L. Vaniglia, West Chester; Perry J. Anderson; Dennis G. O'Keefe, both of Cincinnati, all of Ohio

[73] Assignee: Cincinnati Milacron Inc., Cincinnati, Ohio

[21] Appl. No.: 874,729

[22] Filed: Jun. 16, 1986

[51] Int. Cl.⁴ .............................................. G05B 19/02
[52] U.S. Cl. ..................................... 364/141; 364/162; 364/180; 364/476
[58] Field of Search ............... 364/140, 141, 142, 143, 364/162, 476, 180

[56] References Cited

U.S. PATENT DOCUMENTS

| | | | |
|---|---|---|---|
| 3,859,400 | 1/1975 | Ma | 264/40 |
| 4,215,397 | 7/1980 | Hom | 364/162 |
| 4,363,090 | 12/1982 | Garcia | 364/141 |
| 4,486,830 | 12/1984 | Taylor, Jr. et al. | 364/141 |
| 4,558,430 | 12/1985 | Mogami | 364/900 |
| 4,587,470 | 5/1986 | Yamawaki | 318/564 |
| 4,642,760 | 2/1987 | Yonai et al. | 364/141 |
| 4,663,704 | 5/1987 | Jones et al. | 364/146 |
| 4,683,549 | 7/1987 | Takaki | 364/141 |
| 4,689,736 | 8/1987 | Glaudel et al. | 364/140 |

Primary Examiner—Jerry Smith
Assistant Examiner—John R. Lastova
Attorney, Agent, or Firm—John W. Gregg

[57] ABSTRACT

A method and apparatus are provided for producing a control signal by digital computation for controlling an element affecting a process. The process is described by a sequence of activities, and the onset of each activity is marked by a predetermined change of a process parameter. An event detector is provided for detecting the occurrence of predetermined changes of process parameters in response to data included within event detector data blocks. The event detector data blocks include data defining the desired response to the detection of a predetermined change of a process parameter. The control signal is produced in accordance with a selected predetermined algorithm using data included in algorithm data blocks. A first event detector data block and a first algorithm data block are selected defining a first predetermined change of a process parameter and a first algorithm. Upon detection of the first predetermined change, of a process parameter, a second predetermined change of a process parameter is selected in accordance with data included within the first selected event detector data block and a second algorithm data block is selected defining a second algorithm.

10 Claims, 6 Drawing Sheets

METHOD AND APPARATUS FOR PROCESS CONTROL

BACKGROUND OF THE INVENTION

This invention relates generally to process control. In particular this invention relates to control of continuous processes using programmable controllers.

Continuous process control has traditionally been effected using dedicated analogue circuitry to measure process parameters and produce control signals. Analogue circuit elements were used to define control algorithms and were not assignable from one process to another. With the advent of high speed digital processors, analogue to digital converters, and digital to analogue converters, it has become possible to control continuous processes using general purpose programmable digital computing elements to execute control algorithms. Nevertheless, the response of digital systems to events occurring in rapidly changing circumstances is unsatisfactory in some circumstances for effecting the desired degree of process control. For example, in injection molding processes, large changes in pressure occur within milliseconds during the final stage of mold filling. To control clamping forces it is necessary to respond immediately to the occurrence of mold pressures marking a change in process activity.

Heretofore, it has been necessary to effect such immediate responses outside of the overall process control. Consequently, advantages of using a programmable control are lost with regard to those elements not directly controlled by the programmable control. Further, control circuitry associated with these elements is typically dedicated to particular control algorithms.

SUMMARY OF THE INVENTION

It is one object of the present invention to provide a method and apparatus for continuous process control using a general purpose programmable digital processor to execute selectable control algorithms.

It is a further object of the present invention to provide a method and apparatus for continuous process control wherein an element is controlled selectively by a plurality of control algorithms.

It is a still further object of the present invention to provide a method and apparatus for continuous process control by a programmable digital processor and to provide immediate response to the occurrence of predetermined events detected by continuous comparison of selected analogue inputs with predetermined limits.

It is a still further object of the present invention to provide continuous process control by a programmable digital processor executing programmable proportional, integral, and derivative (PID) control algorithms in response to the detection of selected analogue input signals exceeding predetermined limits.

Further objects and advantages of the present invention shall become apparent from the following detailed description and attached drawings.

In accordance with the aforesaid objects a method and apparatus for continuous process control are provided. A plurality of analogue output circuits for providing analogue control signals are selectively associated with predetermined algorithms selectively involving proportional, integral, and derivative control functions. A programmable digital processor periodically executes the algorithms to produce current values for the control signals. In addition, the processor produces limit signals representing predetermined values for continuous comparison with selected analogue input signals. In response to detection of an analogue input signal exceeding a limit, algorithm processing is suspended and processing of alternative algorithms is selectively initiated. Individual control elements of the controlled process are thus made responsive to plural algorithms depending on the current activity of the controlled process.

DETAILED DESCRIPTION OF THE PREFERRED EMBODIMENT

The preferred embodiment to be described corresponds to a programmable control for an injection molding machine manufactured by Cincinnati Milacron Inc., the assignee of the present invention. This control is used for selectively controlling the velocity and pressure of the injection ram to insure the desired degree of filling of the mold cavity. Control is effected by producing control signals in response to execution of both open loop algorithms and closed loop algorithms including proportional, integral and derivative (PID) components. The digital portions of this control have been implemented using microprocessors and associated peripheral devices available from Intel Corporation. In addition, commercially available analogue to digital convertors, digital to analogue convertors, analogue switches, and analogue multiplexers have been used for implementation of the analogue portions of the control. It is to be understood that other devices of greater or lesser complexity may be substituted and it is not intended that the particular implementation described in anyway limit the scope of the appended claims. The preferred embodiment is implemented as an interface module for use in association with a programmable logic control product available from the assignee which is programmed as described in U.S. Pat. No. 4,486,830. The programming of the preferred embodiment is accomplished by means of data exchanges between the programmable logic control product and the preferred embodiment over a connecting bus.

Figure 1:
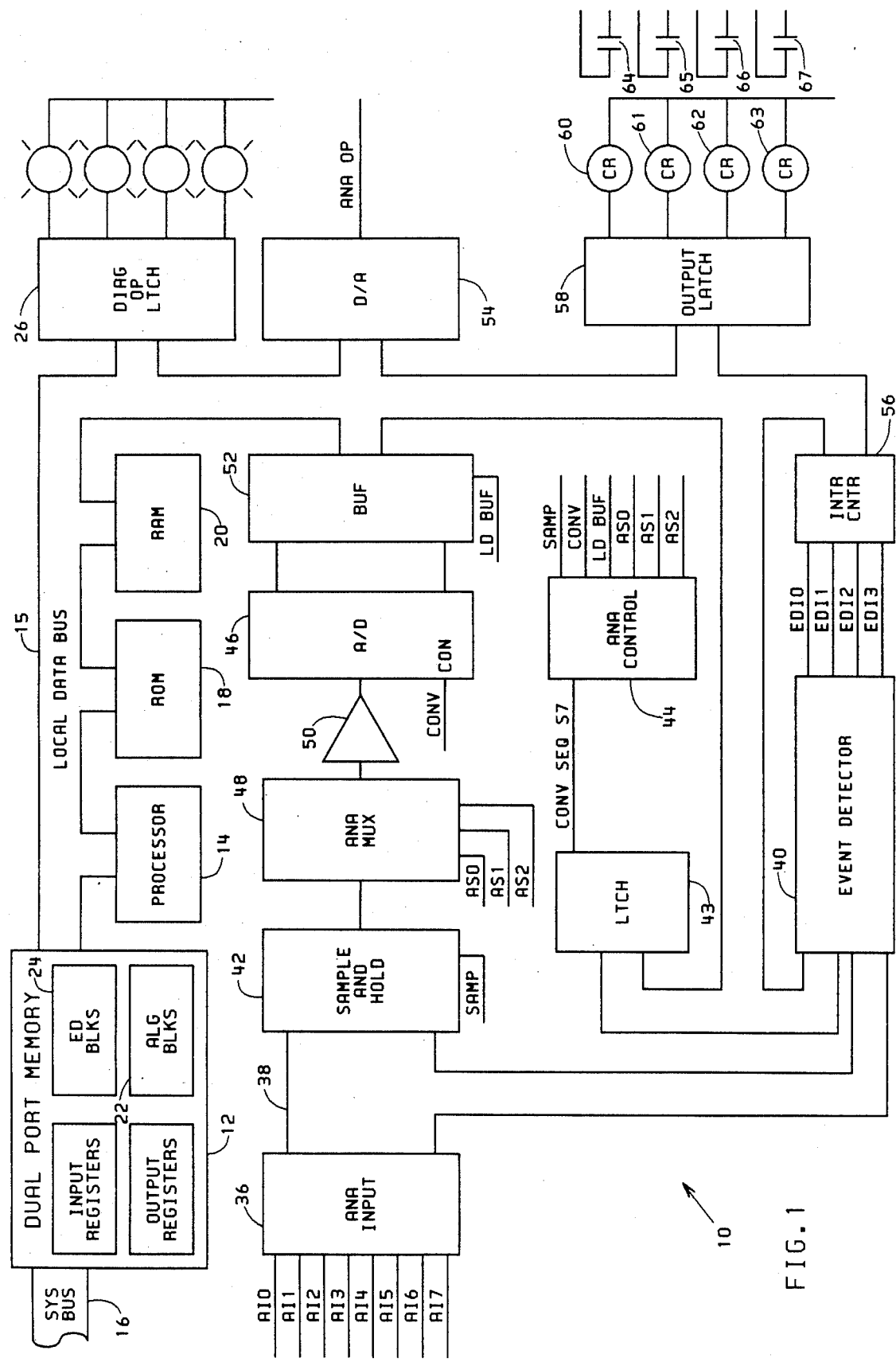
FIG. 1 is a block diagram of a control for controlling a continuous process.

Referring to FIG. 1, the injection mold analogue control 10 is interfaced to an injection molding machine control (not shown) through the dual port memory 12. Digital data is exchanged between local processor 14 and the programmable logic controller used for controlling the overall cycle of the machine operation through dual port memory 12 by transmission of data over the system bus 16. Applicants have selected the Intel 80186 Microprocessor as the local processor 14. This processor transmits and receives data and addresses over the local data bus 15. The operating system programs for processor 14 are stored in read only memory (ROM) 18. A local random access memory (RAM) 20 is used for temporary storage of data associated with the process control algorithms being executed by processor 14. The algorithm information is stored as blocks of algorithm data in the algorithm block store 22. Process event detection data is stored as event detection block data in the event detection block store 24.

When power is applied to the control, processor 14 effects the execution of diagnostic routines testing the contents of the local ROM 18 and local memory 20. Diagnostic failures are stored in the diagnostic output latch 26 and indicated by the energization of lights 28 through 34. In addition to the initialization diagnostic execution, processor 14 executes diagnostic procedures on the local memories as a part of its overall processing procedure.

The analogue portion of the control includes the analogue input buffers 36 receiving analogue input signals representing parameters of the controlled process. Examples of input signals for the control of the injection molding ram include the ram position input, the ram hydraulic pressure, and the mold cavity pressure. The analogue input signals are transmitted to the local analogue bus 38 where they are available to the event detection circuitry 40 and the sample and hold circuitry 42. The event detection circuitry 40 shall be described in greater detail subsequently. The sample and hold circuitry 42 includes a plurality of analogue switches and a plurality of storage capacitors. The analogue input signals are periodically sampled by momentarily connecting the analogue input signals to the storage capacitors in response to the occurrence of a sample signal. This signal is generated by the analogue control circuitry 44.

In order for processor 14 to effectively control the injection molding ram, it is necessary that it be provided with a digital representation of selected process parameters. It is therefore necessary that the analogue input signals be converted to digital signals. The accuracy of the analogue to digital conversion depends upon the stability of the analogue input to the analogue-to-digital convertor 46 during the conversion process. The stability of the analogue input to the analogue to digital convertor 46 is assured by the storage of the selected analogue input signal on a storage capacitor within the sample and hold circuitry 42. The selection of the analogue input to be converted by analogue to digital convertor 46 is effected by the analogue multiplexer 48 in response to the analogue control signals AS0, AS1 and AS2 produced by the analogue control circuitry 44. The selected analogue signal is presented to the input of the analogue-to-digital convertor via the buffer amplifier 50. Conversion of the analogue signal to digital signals is effected in response to the production of the convert signal CONV at the convert input of the analogue to digital convertor 46. The analogue control circuitry 44 produces the convert signal subsequent to a change of the select signals at the select inputs of the analogue multiplexer 48. A delay is necessary to permit the output of the analogue multiplexer to achieve the value of the desired analogue signal. The digital representation of the analogue input is then loaded into a buffer store 52 where it is accessible to processor 14 over the local data bus 15.

The analogue control circuitry 44 sequentially produces sample, select, and convert signals to effect the periodic sampling and storage of analogue signals, the conversion of the analogue signals to digital signals, and in the storage of the digital signals. Processor 14 periodically produces command signals to effect the initiation of the analogue control sequence. These commands are latched from local data bus 15 in latch 43 to produce the convert sequence start input signal to analogue control 44.

As previously stated, processor 14 effects control over the process by the production of control signals in response to the execution of control algorithms. The digital control signals produced by the execution of these algorithms are transferred to the digital to analogue convertor 54 from which the analogue control signals are supplied to drive amplifiers for controlling machine elements not shown.

To provide immediate response to the occurrence of events during the execution of the process, the event detector continuously monitors selected analogue input signals on the analogue bus 38. In addition, the event detection circuitry 40 is connected to the local data bus 15 over which it receives limit signals for comparison with selected analogue input signals. The event detection circuitry 40 produces an output when it detects that a selected analogue input signal has exceeded a predetermined limit. These outputs are input to the interrupt control 56 connected to local data bus 15. Interrupt control 56 effects the interruption of program execution by processor 14 and initiates the execution of an interrupt response routine. Processor 14 uses the information stored in the event detector block store 24 to effect a response to the reception of an interrupt signal from interrupt control 56. As will be described in more detail subsequently, processor 14 may suspend the execution of an algorithm and initiate the execution of an alternative algorithm in response to the occurrence of an interrupt produced as a result of the detection of a predetermined event.

While it is intended that process control 10 be connected to a programmable controller, an additional output interface has been provided to effect immediate control over selected machine elements. Output latch 58 connected to local data bus 15 receives digital output signals for energizing selected control relays 60 through 63. The relay contacts 64 through 67 are available for direct connection to selected machine elements.

Figure 2:
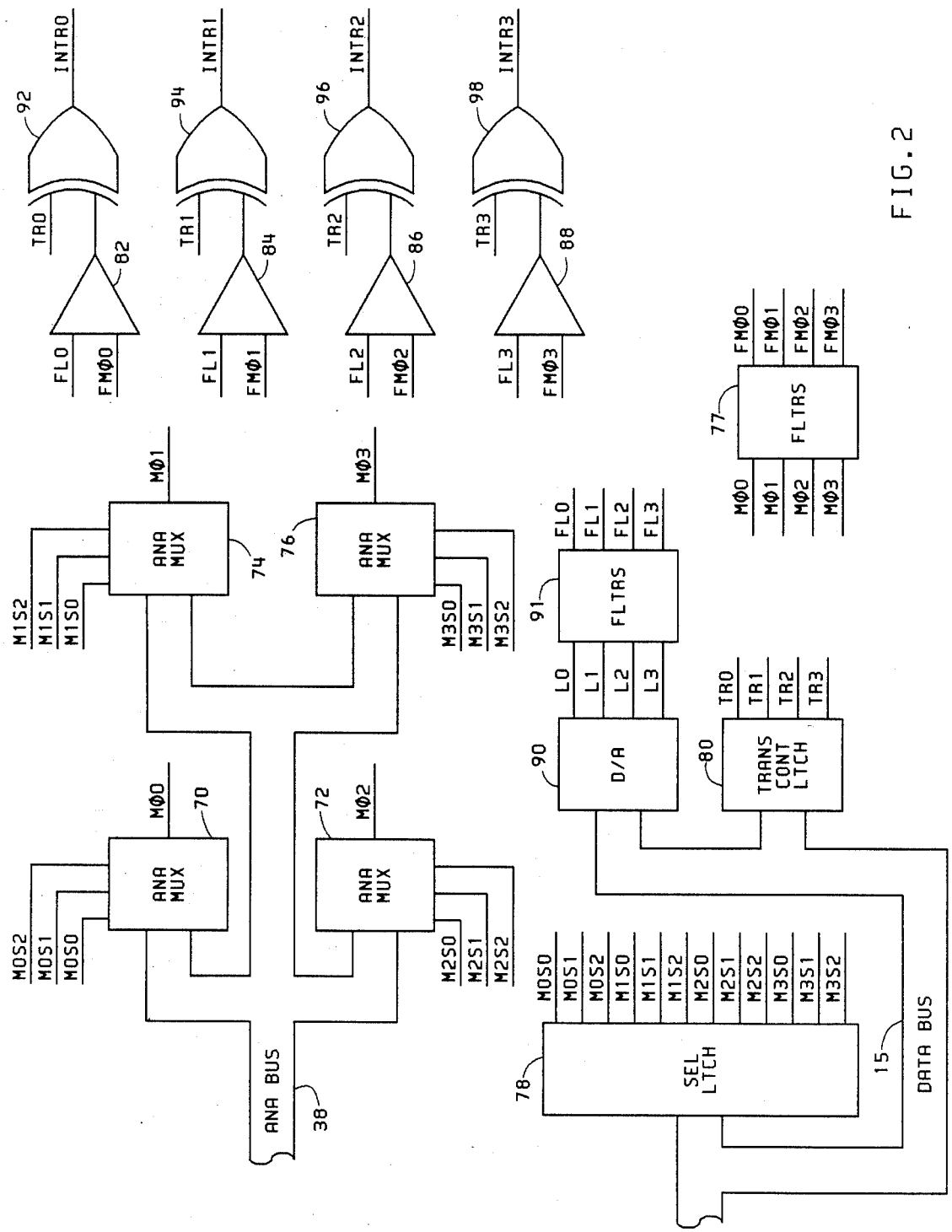
FIG. 2 is a detailed block diagram of event detection and control circuitry.

Referring now to FIG. 2, the event detection circuitry 40 shall be described in detail. Analogue multiplexors 70 through 76 are connected to analogue bus 38. Each analogue multiplexor is controlled by three select signals and each produces a single analogue output. The select signals M0S0 through M3S2 are received over data bus 16 and latched in the select signal latch 78. The multiplexor analogue output signals M00 through M03 are passed through low pass filters 77 and applied as inputs to analogue comparaters 82, 84, 86 and 88. Analogue limit signals L0, L1, L2, and L3 are produced by the digital-to-analogue convertor (DAC) 90 receiving digital limit signals from local data bus 15. The comparater outputs are passed through low pass filters 91 and input to the exclusive OR circuits respectively, 92, 94, 96 and 98. Each exclusive OR receives a transition control signal TR0 through TR3 for controlling the transition of the comparater output to which the exclusive OR circuit will respond. The transition control signals are received from processor 14 over data bus 15 and stored in the transition control latch 80.

The outputs of comparaters 82 through 88 will change from a nominally low level to a nominally high level when the selected analogue input signal exceeds the value of the limit signal at the input of the comparater. Conversely, each comparater output will transition from a nominally high signal to a nominally low signal when the selected analogue input signal at the input of the comparater falls below the level of the corresponding limit signal. The transition control signals are effective to select which of these transitions shall produce a signal change at the output of the respective exclusive OR circuit. The outputs of the exclusive OR circuits 92 through 98 are input to interrupt control circuit 56 of FIG. 1. The values for the limit signals, the transition control signals, and the analogue multiplexer select signals are all derived from data stored within the event detection block store 24.

As will now be appreciated, the process control 10 achieves control in response to programmable algorithms and events involving process parameters. Specific information defining the control algorithms and the associated constants, limit values, input and output channels and rates of change of outputs is stored as data blocks within the algorithm block store 22. Likewise, particular information defining the event detection trigger levels, output setpoints, output drives and event response is stored as blocks within event detector block store 24. The blocks of data are transferred to the process control 10 over the system bus 16 as directed by commands from the programmable logic control. Such commands are transmitted as bits within dual port memory 12 by the programmable logic control.

The procedure by which process control 10 stores data received from the programmable controller will be described with reference to the flow chart of FIG. 3. This flow chart represents background processing carried on by processor 14 pending the execution of a control algorithm or a procedure for responding to an interrupt received from interrupt control 56. In general, the background processing continues until the processor receives an interrupt from an internal timer used to control the selection of algorithm processing or an interrupt signal from the interrupt control 56. The process controller and the programmable controller communicate over the system bus 16 by transmitting and receiving bit and word data. The control of block data transfer through the dual port memory is effected by the status of bits used variously to indicate that data is to be transferred and that the data transfer has been completed. In addition to the block data, word data is exchanged as contents of predefined registers representing allocated locations within the dual port memory which permits access by the local processor and the remote programmable controller without requiring the use of control bits. Table I below identifies selected registers and provides a summary of the data description for which the register is allocated.

TABLE I

Input Registers

SELECT—identifies algorithm block, and event detection block and sets initial status of both.
DACS—provides overriding output value for output digital-to-analogue converter (DAC).
SETPOINT—provides initial target value loop command.
ED ENTRY—provides new data for event detector block.
WDOG—provides initial value for process control scan counter.

Output Registers

INPUTS—analogue to digital converter (ADC) values.
OUTPUTS—Output DAC values.
ED INDEX—event detector index values.
SNAPSHOT—triggered sample of ADC values.
ERROR—interface error code values.
MV TERM—most recent value of loop measured variable.
ERR TERM—most recent value of loop error.
DERV 2—second order derivative of input channels for loops.
WDOG—current value of watchdog counter.

Figure 3:
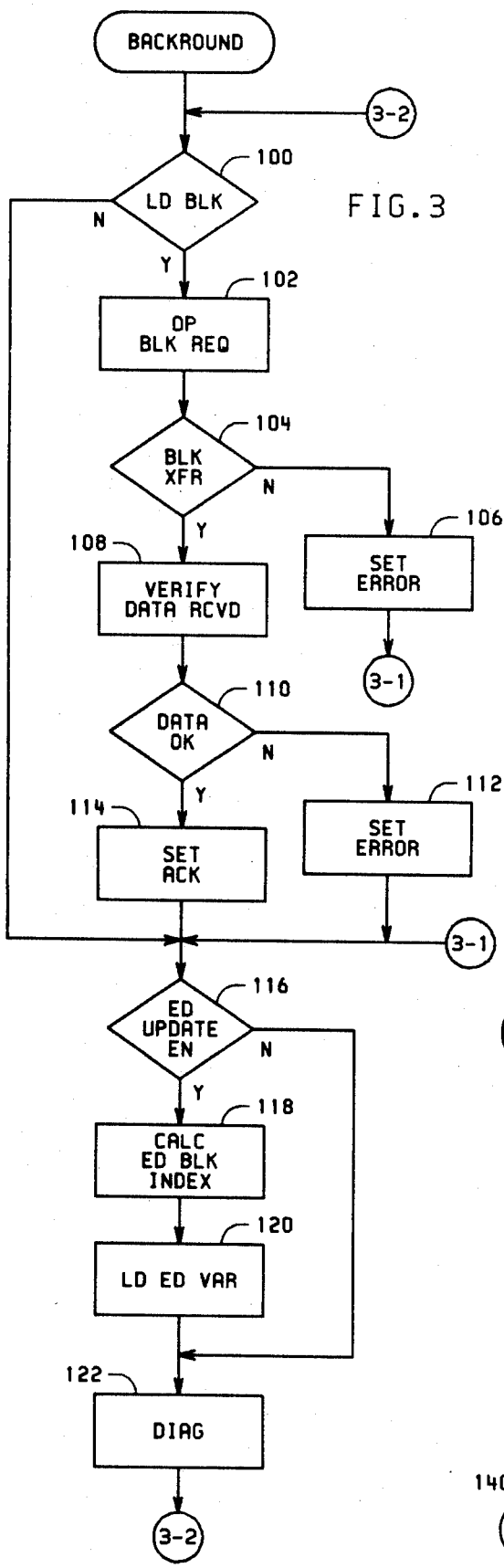
FIG. 3 is a flow chart illustrating a procedure used by the control to store new program information.

Referring to FIG. 3 at decision step 100, locations within dual port memory 12 are examined by processor 14 to determine whether or not the programmable controller (not shown) has transmitted a request that data blocks be loaded to local memory 20. If no load request is indicated, execution of the background processing procedure continues at decision step 116 where it is determined whether or not the programmable controller has set bits within dual port memory 12 indicating that event detection blocks within event detection block store 24 are to be updated. If not, execution of the background processing procedure continues at process step 122 where a diagnostic routine is executed. This is the diagnostic routine hereinabove described which effects a test of the local ROM and RAM memories. Thereafter, execution of the background processing procedure continues through the on page connector 3-2 at decision step 100. This processing will in general continue until the occurrence of an interrupt to the processor 14 either as a result of an internal timer or the production of an interrupt signal by interrupt control 56.

If it had been determined at decision step 100, that the programmable controller had requested that a block be loaded, execution would continue at process step 102. At process step 102, the local processor outputs a request for the block through dual port memory 12 and via system bus 16 to the programmable controller. At decision step 104, it is determined whether or not the requested block transfer can be performed. If the block transfer cannot be performed, the processor sets an error as indicated at process step 106 and execution of the background processing procedure continues at decision step 116 via the on page connector 3-1. If it is determined at decision step 104 that the block transfer can be effected, upon completion of the block transfer, the data received is verified at process step 108. Thereafter, at decision step 110, it is determined whether or not the data verification indicated that the data received was within predetermined limits and if not, an error is set at process step 112. If it is determined at decision step 110 that the received data is satisfactory, an acknowledge signal is transferred to the programmable controller through the dual port memory 12.

If upon examination of register contents within the programmable controller it is determined that an event detector block update is enabled, execution continues at process step 118 where the processor computes an event detector entry index. This identifies the location within event detector block store 24 where a block of event detection data begins. At process step 120, event detector variables are transferred to dual port memory 12 from the registers within the programmable controller. Thereafter, execution of the diagnostic procedures is effected by process step 122.

Figure 4:
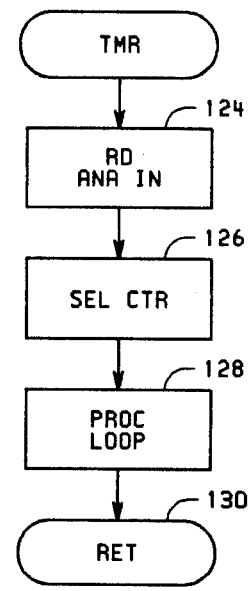
FIG. 4 is a flow chart of a procedure for overall processing control.

As previously stated, the execution of the background processing procedure will continue until the occurrence of an interrupt generated by an internal timer. To effect the periodic processing of control algorithms, a one millisecond timer transfers control from background processing to the execution of the procedure represented by the flow chart of FIG. 4. Referring to FIG. 4, at process step 124, the analogue input data is read by processor 14 through buffer 52 in preparation for execution of a control algorithm. At process step 126 the algorithm select subroutine is executed to identify the control algorithm to be executed. Upon completion of execution of the select subroutine, execution of the procedure of FIG. 4 continues at process step 128 where the control algorithm processing procedure is executed. Thereafter, execution of the background processing procedure is resumed via the return through terminal 130.

Figure 5:
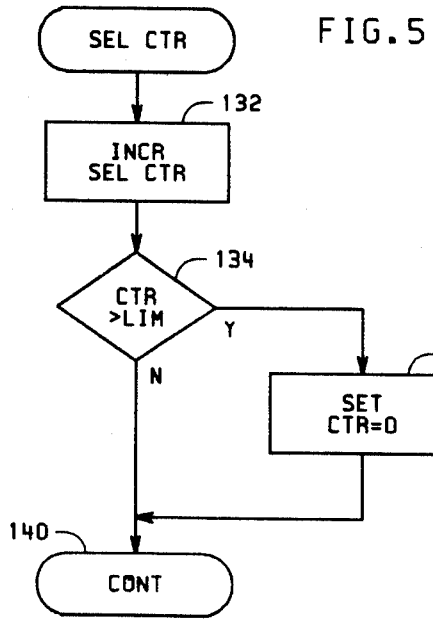
FIG. 5 is a flow chart of a procedure for selecting a control signal algorithm for processing.

The algorithm select subroutine associated with process step 126 of FIG. 4 shall be described with reference to FIG. 5. At process step 132, a select counter is incremented. At decision step 134, it is determined whether or not the counter has exceeded its predetermined limit. The preferred embodiment provides for the simultaneous execution of four control algorithms. Thus, the limit for decision step 134 is three. If it is determined at decision step 134 that the select counter has been incremented to a number greater than its limit, it is reset to zero at process step 136. If it is determined at decision step 134 that the select counter contents have not exceeded the limit value, process step 136 is skipped. Execution of the procedure of FIG. 4 is continued via the continue of terminal 140.

Figure 6:
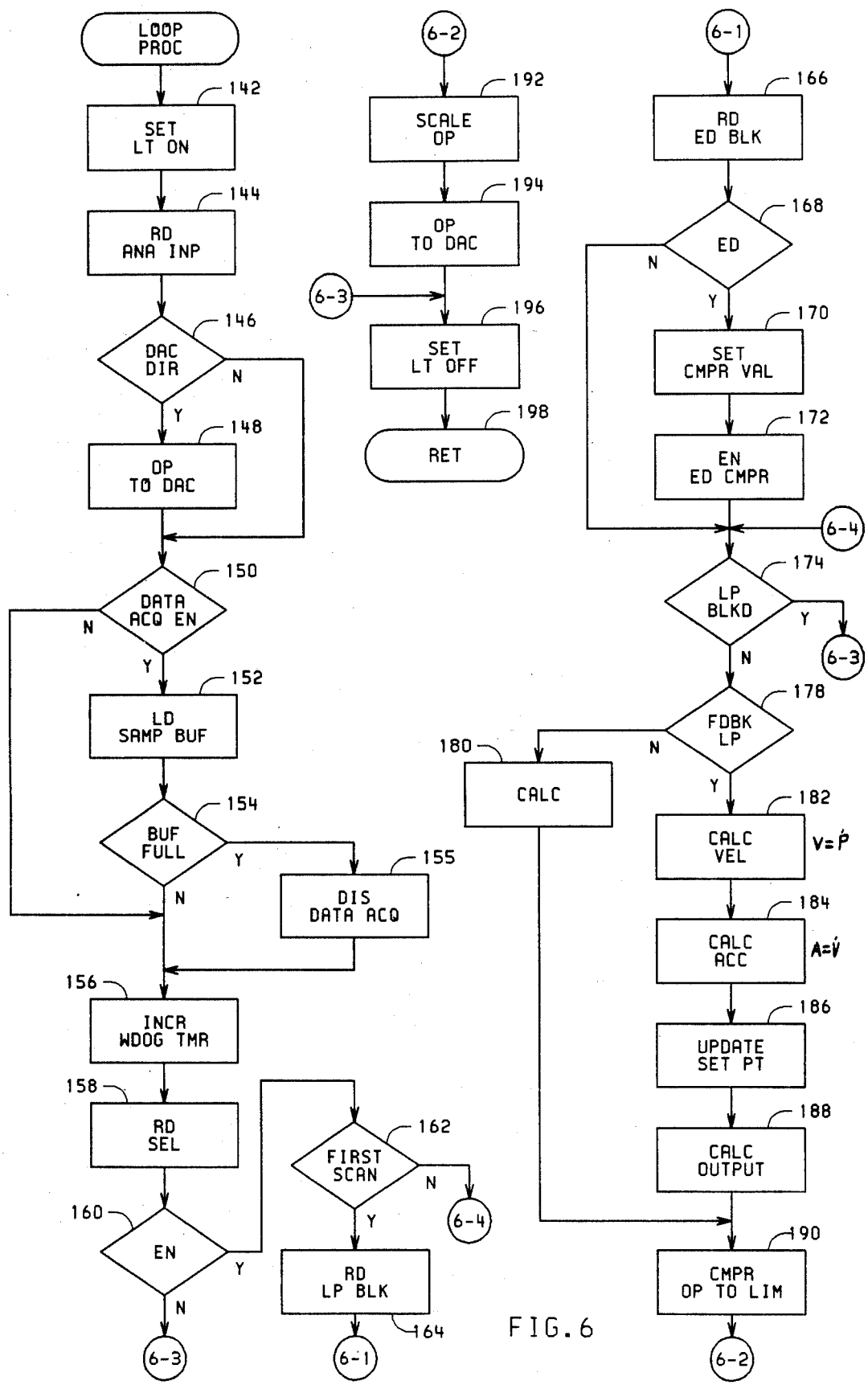
FIG. 6 is a flow chart of an algorithm processing procedure.

The procedure for processing loop algorithms associated with process step 128 of FIG. 4 shall be described with reference to FIG. 6. At process step 142, the loop processing flag is set indicating that processor 14 is executing a control algorithm. At process step 144, the analogue inputs are transferred from the buffer 52 to dual port memory 12. At decision step 146, selected registers are examined to determine whether or not a direct output to the digital to analogue converter for a selected control signal has been commanded by the programmable controller. If so, the value read from the registers is output directly to the D/A converter 54 by process step 148. If no direct output is demanded, process step 148 is skipped. At decision step 150, it is determined whether or not a high speed data acquisition block has been loaded and enabled and an associated trigger has occurred. If so, data acquired from a selected analogue input is transferred to an allocated location in dual port memory for access by the programmable control. If no data acquisition block has been loaded, or if the data acquisition block has not been enabled or if the trigger condition has not occurred, process step 152 and decision step 154 are skipped. Decision step 154 determines when the allocated space is full during the loading process. If it is determined that the allocated space is full, process step 155 disables the data acquisition block so that steps 152 through 155 are skipped in subsequent executions of the loop processing routine.

At process step 156, the algorithm processing control (watchdog) timer is incremented. This control timer is used to override algorithm processing in the event excess processing time is consumed as would occur in the event of a data processing malfunction. At process step 158, the select register identified by the select counter is read. The select register identifies the control algorithm block to be executed and associates an event detector block with the control algorithm block. These identifications serve as indexes to the algorithm block store 22 and the event detector block store 24. Further, each control algorithm defines the association of selected analogue inputs with a selected control signal. Each algorithm stored within algorithm block store 22 has an associated status reflected by bits within store 22. If a control algorithm is not to be processed, an enable status signal within store 22 will be reset. At decision step 160, it is determined whether or not the enable status signal has been reset. If so, processing for this algorithm is not permitted and the control processing procedure is terminated through on page connector 6-3, process step 196, and the return of terminal 198.

If it is determined at decision step 160 that the control algorithm processing status signal is set, execution continues at decision step 162 which determines whether the current execution is the first execution of the selected algorithm after it has been enabled. The first execution of the selected algorithm involves initialization of values used in subsequent iterations by steps 166-172. If the present execution is not the first execution steps 166-172 are skipped through the on page connector 6-4. If the present execution is the first execution, the control algorithm block within store 22 is read at process step 164. Thereafter, execution of the control algorithm processing procedure continues through the on page conector 6-1 at process step 166. At process step 166, the associated event detection block, if any, is read. At decision step 168 it is determined whether an event detector block is associated with the control algorithm. If an event detector block is associated with the control algorithm, the limit value for comparison within event detector 40 is output to the digital-to-analogue converter 90 by process step 170. At process step 172, the event detector comparison is enabled effectively arming the associated interrupt at interrupt control 56. If no event detector is associated with the control algorithm, process steps 170 and 172 would be skipped.

At decision step 174, it is determined whether or not the control algorithm status indicates that control processing is inhibited, that is whether or not the algorithm is blocked. If it is determined at decision step 174 that control algorithm processing is inhibited, the execution of the control processing procedure is terminated through on page connector 6-3, process step 196, and the return of terminal 198.

If the control algorithm processing is not inhibited, execution of the algorithm processing procedure continues at decision step 178 where it is determined what type algorithm has been selected. The process control of the present invention contemplates both open loop and closed loop control techniques. If it is determined that feedback is provided, execution proceeds through a series of steps to produce a loop target set point or loop command which is used in the calculation of the value of the control signal. At process step 182, a velocity value is calculated as a derivative of a position signal produced by the injection molding machine RAM. At process step 184, an acceleration value is calculated as the derivative of the velocity value calculated at process step 182 and at process step 186 a new value of the set point is computed in accordance with one of two algorithms. If the rate of change in the set point value is to be effected in accordance with a time based ramp, the new value of the set point is calculated as the sum of the current set point value and the product of the computed acceleration rate and a predetermined sample rate. Alternatively, if a position based ramp is desired, the new set point value is computed in accordance with the following formula.

$$\text{New Set Point } (NSP) = 2 \times P \times A$$

where A = acceleration rate $$P = [ISP^2/2A] + RSP - CURPOS$$

where
ISP = initial set point
RSP = ramp start position
CURPOS = current position and defines the absolute position of the enclosed expression.

Thereafter, execution continues at process step 188 where the value of the control signal is computed in accordance with a loop algorithm involving the instantaneous value of a measured variable.

At process step 188, the control algorithm is evaluated using the new value of the target set point and the stored values for the algorithm component coefficients K1, K2 and K3 retrieved from the algorithm block store 22 and defining respectively the gain factors for the proportional, integral, and derivative components of the output. The control algorithm is expressed as $$V = V_{k-1} + K1n + K2m + K3b$$

where
$n = [E_k - E_{k-1}]/100$
$m = E_k \times 1000$/sample rate and $b = (MV_k - 2MV_{k-1} + MV_{k-2})/10 \times$ the sample rate where $E = $ Setpoint $- MV$ k is the iteration number
MV is defined as the measured variable and
V is the loop output.

If it had been determined at decision step 178 that no feedback is provided, execution proceeds at process step 180 where the value of the output is calculated according to alternative algorithms for controlling the rate of change of the output. If it is desired to control the rate of change of the output as a function of time, the new value of the output is calculated as the sum of the current value and the product of a programmed acceleration rate and a predetermined sample rate. If the rate of change of the output is to be controlled as a function of position, the new output value is calculated as the sum of the previous output, and the product of the programmed acceleration rate, the distance moved and a predetermined sample rate.

Following the algorithm calculation execution continues at process step 190 where the value resulting from process step 180 or 188 is compared to output limits stored in the algorithm block store 22. Should the computed value of the output be greater than a maximum or less than a minimum, the value is clamped to the maximum or minimum value respectively. Thereafter, at process step 192, the output is scaled in accordance with scale factors stored with the control algorithm block data in store 22. Thereafter, execution continues through on page connector 6-2 to process step 194 where the scaled value is output to the D/A converter 54. Upon completion of the transfer of the digital value to the D/A converter, the control algorithm processing flag is reset at process step 196 turning off a light and execution of the background processing procedure is resumed via the return through terminal 198.

It will be appreciated that the execution of the control algorithm processing procedure by processor 14 is suitable for producing control signals in response to measured values of process parameters. Further, the control signals can be produced where no feedback is provided and in such cases, a value for the control signal is computed without proportional, integral, and derivative functions.

In addition to the algorithm processing, process control 10 provides for immediate response to the occurrence of predetermined events during the execution of the process. As previously described, the event detection circuitry 40 provides for the continuous comparison of selected analogue input signals with predetermined limit signals. If as a result of this comparison, it is determined that a selected analogue input signal has exceeded a limit value, marking the occurrence of an event, an interrupt signal is produced by the interrupt control causing processor 14 to initiate the execution of an interrupt service routine which shall be described with reference to FIGS. 7A and 7B. In general, the event detector interrupt service routine provides for the changing of status of control algorithms and for the alteration of limit signal values used by the event detection circuitry.

Upon the occurrence of an event detection interrupt, an Action word is read from the event detector block store 24 as indicated by process step 200. The Action word provides information relative to the activity of the associated loop control algorithm, the index for the next event detector entry and data associated with the activity of a second loop control algorithm which may be affected by the interrupt response. At decision step 202 it is determined whether or not the loop control algorithm identified by the select register is to be set to a blocked condition. The appropriate action is accomplished by process steps 204 and 206 to set the status to the unblocked or blocked condition respectively. At process step 208 a new value for the target set point defining the desired value of an output channel, is loaded from the appropriate location within the event detector block store to the local RAM. At decision step 210 it is determined whether or not a non-null value for the digital to analogue convertor output has been defined for the triggered event detector. Assuming that a non-null value has been stored, decision step 216 determines whether or not a bit has been set indicating that the digital-to-analogue convertor value is to be output directly or is to be used in the evaluation of the output determined in accordance with the loop algorithm. If the value is to be output directly, process step 220 effects the transfer of the digital value to the digital to analogue converter. Alternatively, process step 218 loads the digital value to the appropriate location within the loop algorithm block store. If it had been determined at decision step 210 that a null value was programmed for the digital to analogue convertor, execution of steps 216 through 220 would be skipped and the execution would continue at process step 212 where the index to the next response sequence step for the triggered event detector is determined.

The event detector interrupt service routines define sequential steps corresponding to the process activity. Each step is marked by the occurrence of an anticipated value of an input signal. Upon the occurrence of an event, the response includes the preparation of the event detector for the next event. At process step 214 the event detector compare point of the next step is read. At decision step 222 it is determined whether the compare point for the next step of the triggered event detector is a null value. If it is, the event detector comparison is disabled, effectively terminating or deactivating the event detector. If it is determined at decision step 222 that the switch point of the next step of the triggered event detector is not null, the event detector is set to trigger on the value read at process step 224. At process step 226 the event detector comparison is enabled. The Action word provides an indication of whether it is desired that an output set point be reached coincidentally with the occurrence of a predetermined value defined by an event detector switch point following a ramp. To achieve this coincidence, a new trigger value for the event detector is calculated using the following algorithm:

$$X = (TSP^2 - \text{old } TSP^2)/2 \times \text{acc or dec}$$

Event detector compare = programmed value (Action word) + or − X.

The activity defined by process steps 222 through 226 effectively controls a sequence of action dictated by the occurrence of events at selected input channels. As predetermined limits are reached, specific action is taken and new limit values established for the next contemplated activity in the process.

Figure 7A:
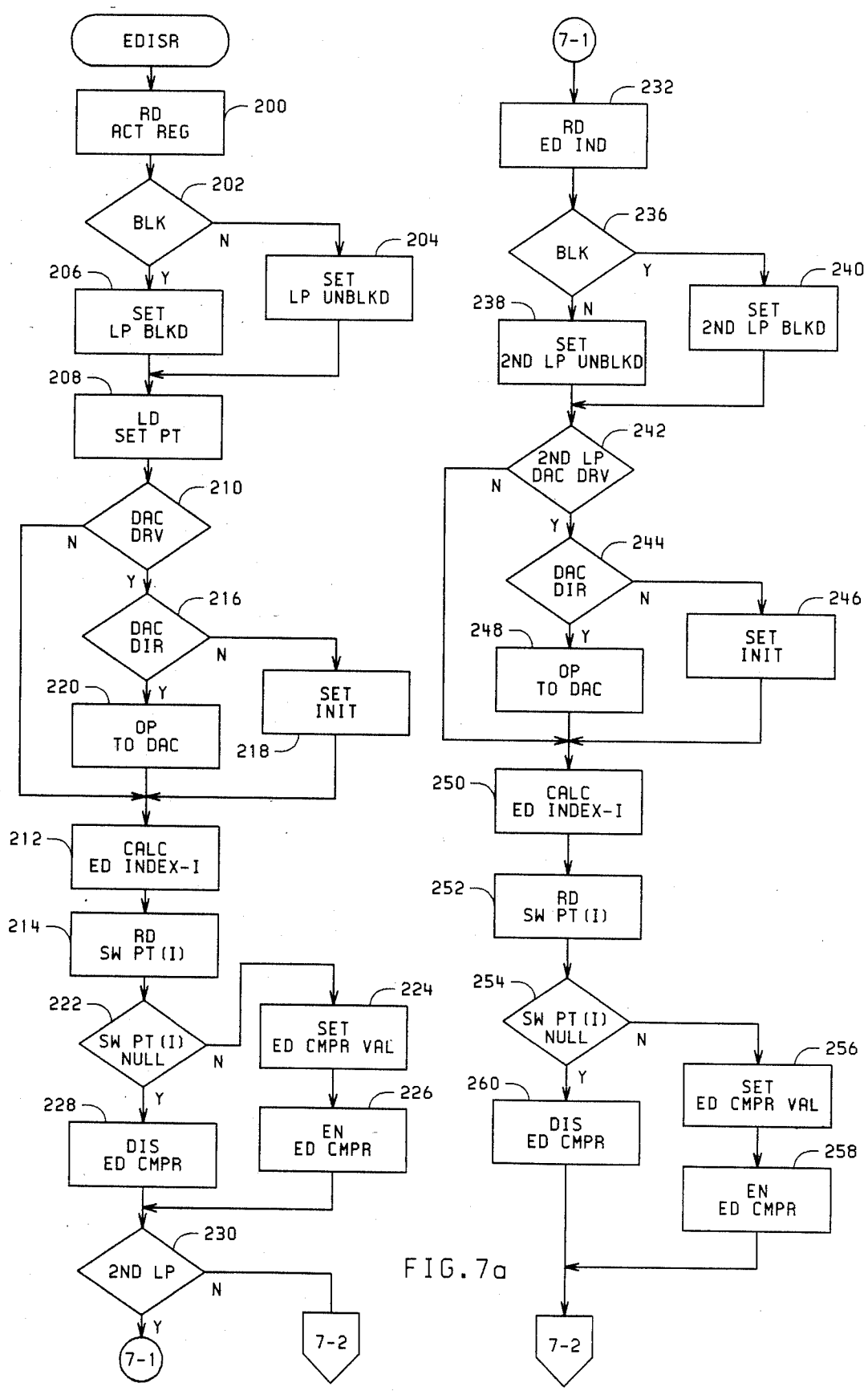
FIGS. 7(a) and 7(b) are flow charts of a procedure for responding to the detection of the occurrence of a predetermined event within the control process.
Figure 7B:
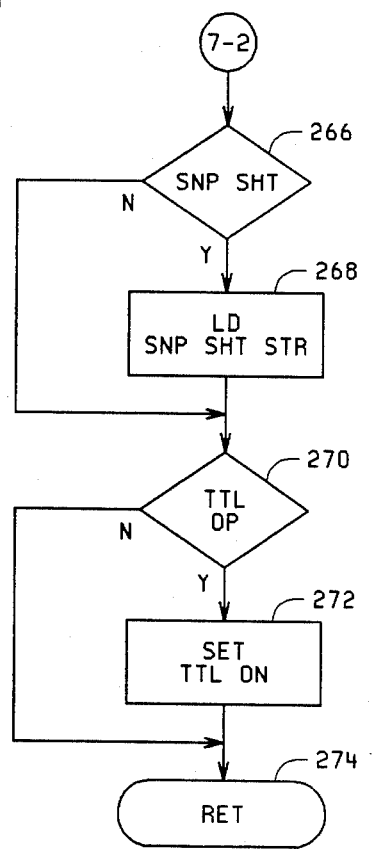

As previously stated the response to the triggering of an event detector may include alterations to a second loop control algorithm in addition to the loop control algorithm with which the event detector is associated by the Select register data. Referring to FIG. 7A, decision step 230 determines whether or not the Action word includes data for effecting modification of the status or information associated with a second loop control algorithm. If the response does not involve a second loop, event detector processing continues through the off page connector 7-2 to FIG. 7B. At decision step 266 it is determined whether or not the Action word indicates that the current values of the eight input channels are to be saved into a register for access by the programmable control. If so, process step 268 loads the digital representation of the input channels to a Snapshot register within the dual port memory 12. At decision step 270 it is determined whether a direct interface output associated with the event detector is to be altered. At process step 272 the state of the direct machine interface output is set in accordance with the data provided in the Action word. Execution of the procedure that was interrupted by the triggering of the event detector is resumed by the return through terminal 274.

If it had been determined at decision step 230 that a second loop control algorithm was to be involved in the response to the event detector interrupt, execution would continue through the on page connector 7-1 at process step 232 where the index identifying the second loop algorithm is read from the Action word. At decision step 236 it is determined whether the second loop control algorithm status is to be set to a blocked or unblocked condition. Process steps 238 and 240 effect the setting of the commanded status for the second loop control algorithm. At decision step 242, it is determined whether or not the digital to analogue convertor output commanded for the second loop control algorithm is a null value. If not, decision step 244 determines whether the digital to analogue convertor output is to be set directly by the target set point value associated with the second loop algorithm. Process steps 246 and 248 perform the same functions as process steps 218 and 220 with regard to the primary loop control algorithm. Following execution of process step 246 or 248 execution of the event detector interrupt service routine continues at process step 250 where the event detector index for the next event detector step of the second loop control algorithm is calculated using data supplied from the Action word. The event detector compare point indicated by the index is read at process step 252 and decision step 254 determines whether or not this event detector step switch point is a null value. If not, the event detector comparison value is set at process step 256 and the event detector comparison is enabled at process step 258. If the switch point identified by the index is a null value the event detector comparison is terminated for that loop at process step 260. Thereafter, execution of the event detector interrupt service routine continues through the off page connector 7-2 to FIG. 7B.

It will now be appreciated that the event detector responses effect a sequential progression of execution of algorithms and detection of events corresponding to activity defining a cycle of operation of the machine. For example, the cycle of operation of the injection molding machine may be described by the following machine activities and the associated process parameters:

| Machine Activity | Monitored Events | Controlled Parameter |
| --- | --- | --- |
| 1. close mold | clamp position | clamp velocity |
| 2. injection | ram position, ram pressure | ram pressure, ram velocity |
| 3. pack and hold | ram pressure, ram position, cavity pressure | ram pressure |
| 4. cure | | clamp pressure |
| 5. open mold | clamp position | clamp velocity |
| 6. plastication | | extruder screw rotation rate, ram pressure |

As the cycle of operation progresses, events marked by predefined positions of the clamp and injection ram, as well as ram pressures effect changes of outputs, and activation of secondary control algorithms and new event detector switch points to control clamp velocity, ram velocity and ram pressure to control the molding process. Particular molding process control techniques are set forth in U.S. Pat. Nos. 3,666,141; 3,693,946; 3,721,512; 3,797,808; 3,859,400; and 3,920,367 all assigned to the assignee of the present invention.

While the present invention has been described with reference to the preferred embodiment, and while the preferred embodiment has been described in detail, it is not intended to limit the scope of the invention thereby. Rather, it is the intention of applicants that the invention be defined by the appended claims and all substitutions, modifications, alterations and equivalents following within the scope thereof.

We claim:

1. In a method for controlling a process wherein an element affecting the process is responsive to a control signal representing a value of a controlled process parameter and the control signal is produced by periodically executing a selected algorithm associated with an activity in a sequence of activities describing the process, and wherein the algorithm to be executed is periodically selected, the improvement comprising the steps of:
   (a) storing event detector data blocks defining predetermined changes of value of process parameters marking the onset of process activities;
   (b) recalling a stored event detector data block associated with the selected algorithm;
   (c) continuously comparing an input signal representing a process parameter to a predetermined trigger value to detect the predetermined change of value defined by the recalled event detector data block; and
   (d) producing an interrupt signal in response to detecting the predetermined change, the interrupt signal interrupting the execution of algorithms and initiating the execution of a predetermined procedure using data stored with the recalled event detector data block.

2. The method of claim 1 wherein the predetermined procedure comprises the step of selectively enabling or disabling the execution of selected algorithms in response to data stored with the recalled event detector data block.

3. The method of claim 1 wherein the recalled event detector data block includes data identifying the storage location of a subsequent event detector data block and the predetermined procedure further comprises the steps of:
   (a) recalling the subsequent event detector data block; and
   (b) replacing the predetermined trigger value of the recalled event detector data block with the predetermined trigger value of the subsequent event detector data block.

4. The method of claim 3 wherein the recalled event detector data block includes data defining a value of the control signal and the predetermined procedure further comprises the step of producing the control signal directly from said data irrespective of the value produced by execution of the selected algorithm.

5. The method of claim 4 wherein the algorithm executed by the processor includes a set point term and the predetermined procedure further comprises the step of replacing the value of the set point term with a value stored with the recalled event detector data block.

6. In an apparatus for controlling a process wherein an element affecting the process is responsive to a control signal representing a value of a control process parameter and the control signal is produced by a processor periodically executing a selected algorithm associated with an activity in a sequence of activities describing the process, and wherein means are provided for periodically selecting an algorithm to be executed, the improvement comprising:
   (a) means for storing event detector data blocks defining predetermined changes of value of process parameters marking the onset of process activities;
   (b) means for recalling a stored event detector data block associated with the selected algorithm;
   (c) means for continuously comparing an input signal representing a process parameter to a predetermined trigger value to detect the predetermined change of value defined by the recalled event detector data block; and
   (d) means responsive to the detection of the predetermined change for producing an interrupt signal to interrupt the processor execution and initiate execution by the processor of a predetermined procedure using data stored with the recalled event detector data block.

7. The apparatus according to claim 6 wherein the means for continuously comparing the input signal to a trigger value further comprises:
   (a) means for producing a trigger value signal in response to an event detector data block, the trigger value signal representing a value of a process parameter associated with a change in process activity;
   (b) means for producing a transition control signal in response to the event detector data block, the transition control signal representing a predetermined direction of excursion of the process parameter value relative to the trigger value;
   (c) comparing means for producing a binary signal representing the relative magnitude of the input signal and the trigger value signal; and
   (d) means for logically combining the transition control signal and the binary signal to detect the predetermined excursion of the input signal relative to the trigger value signal.

8. The apparatus of claim 7 wherein the means for continuously comparing the input signal to a trigger value signal further comprises:
   (a) means for selecting an input signal representing a process parameter in response to the event detector data block; and
   (b) means for filtering the selected input signal prior to applying the input signal to the comparing means.

9. The apparatus of claim 8 wherein the means for logically combining the transition control signal and the binary signal further comprises an exclusive OR circuit.

10. The apparatus of claim 9 wherein the means for producing a trigger value signal further comprises:
   (a) a digital to analogue converter responsive to data stored with an event detector data block for producing an analogue signal representing the trigger value; and
   (b) a filter for filtering the output of the digital to analogue converter to produce the trigger value signal.

* * * * *